Figure 1:
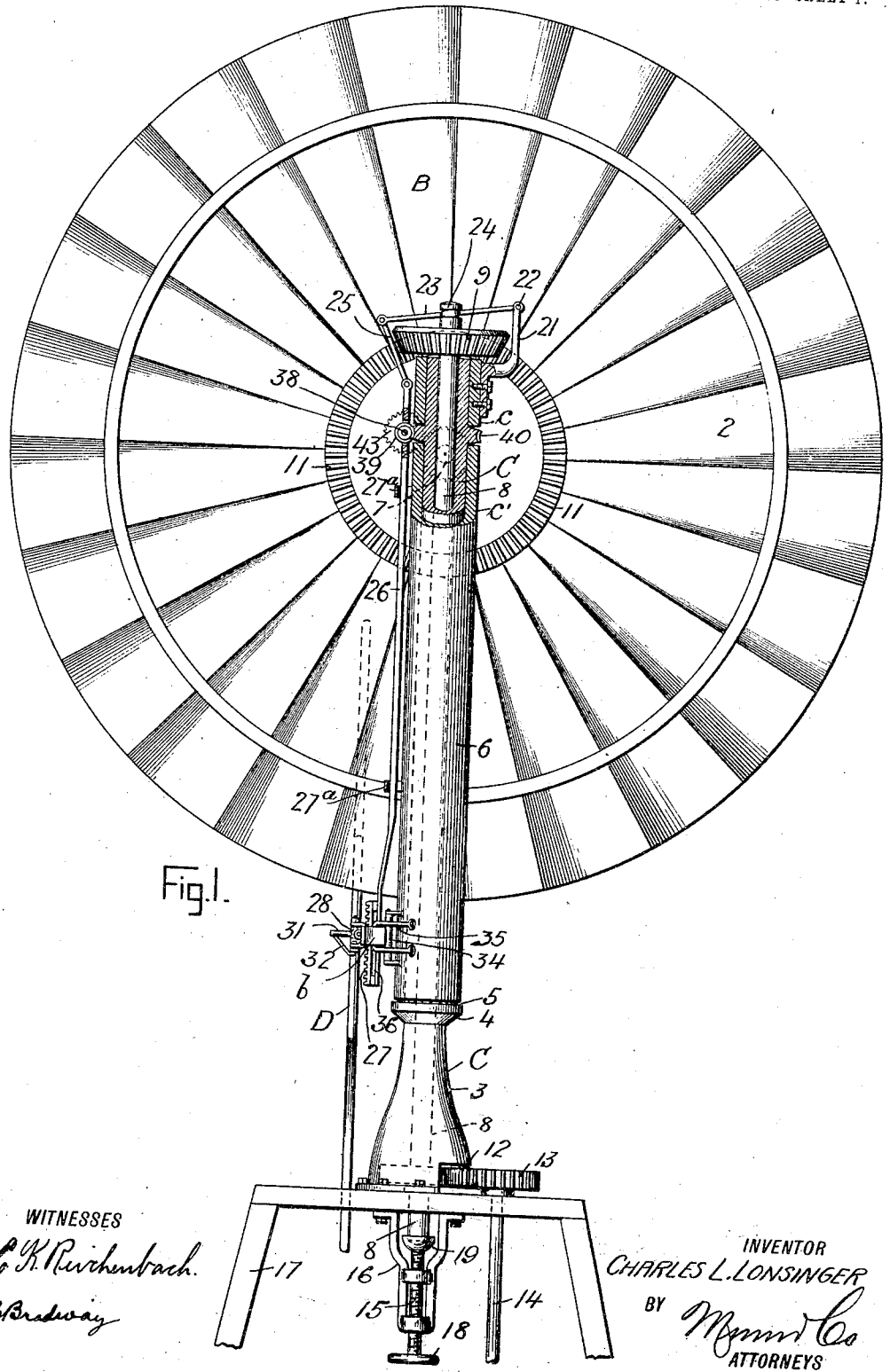

C. L. LONSINGER.
WINDMILL.
APPLICATION FILED SEPT. 19, 1913.

1,110,951.

Patented Sept. 15, 1914.
2 SHEETS—SHEET 1.

WITNESSES

INVENTOR
CHARLES L. LONSINGER
BY
ATTORNEYS

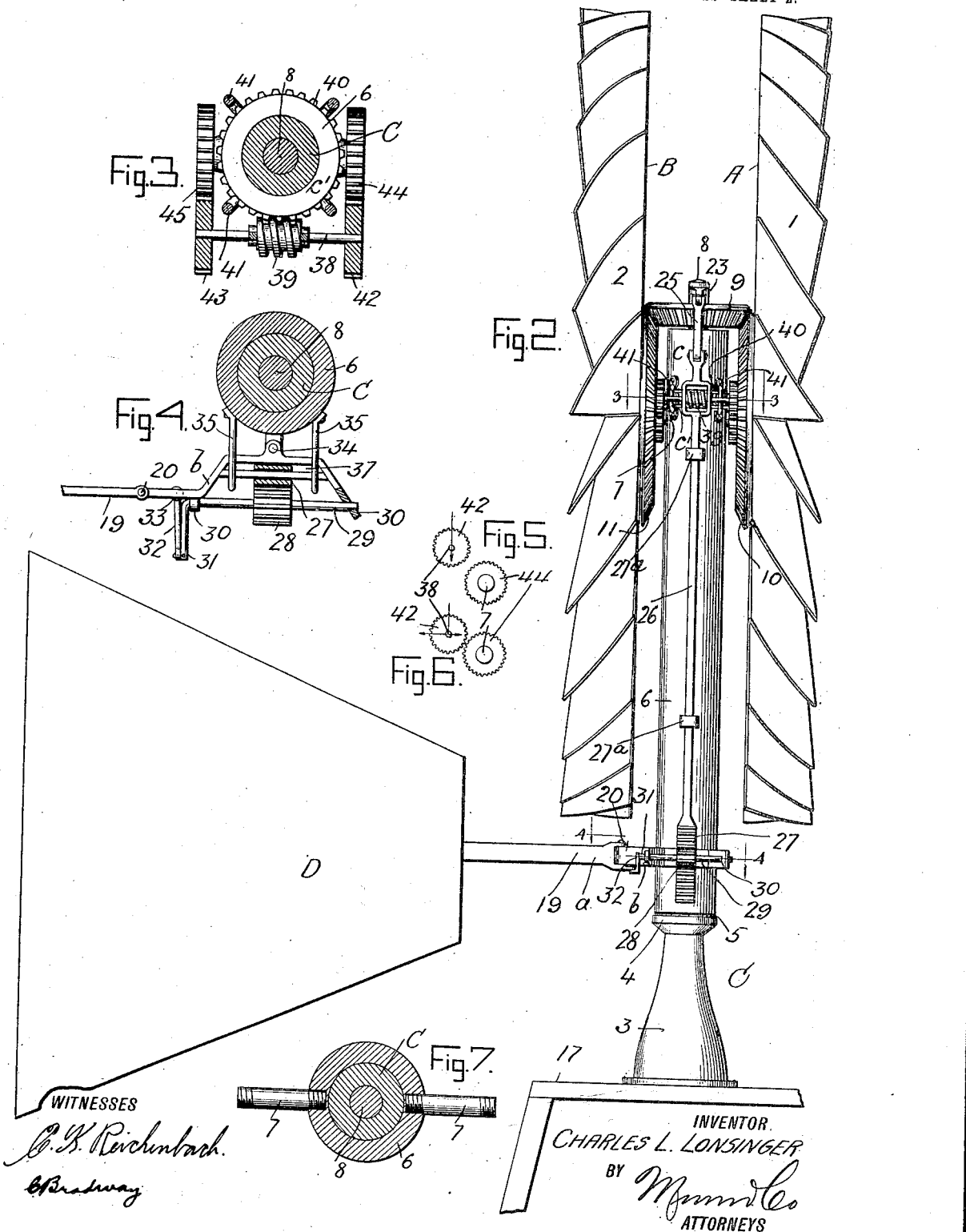

UNITED STATES PATENT OFFICE.

CHARLES LEWIS LONSINGER, OF WALHONDING, OHIO

WINDMILL.

1,110,951.   Specification of Letters Patent.   Patented Sept. 15, 1914.

Application filed September 19, 1913. Serial No. 790,641.

*To all whom it may concern:*

Be it known that I, CHARLES L. LONSINGER, a citizen of the United States, and a resident of Walhonding, in the county of Coshocton and State of Ohio, have invented a new and Improved Windmill, of which the following is a full, clear, and exact description.

This invention relates to wind motors or mills of that type in which a plurality of wheels are employed, with the blades of one wheel reversely arranged with respect to the blades of the other wheel, so that the wind after acting on one wheel is deflected by the vanes thereof to act on the other wheel for the purpose of obtaining a greater power from the wind than is possible with a single wheel.

The general objects of the present invention are to improve and simplify the construction and operation of apparatus of the character referred to so as to be reliable and efficient in use, comparatively inexpensive to manufacture and composed of relatively few parts so designed as to insure long life of the apparatus.

A further object of the invention is the provision of simple, effective and novel means for enabling the wheels to automatically shift with the changes in direction of the wind, so that the wheel will always be at right-angles to the wind.

A further object of the invention is the provision of novel and effective means for throwing the wheel into and out of operation.

With such objects in view, and others as will appear as the description proceeds, the invention comprises various novel features of construction and arrangement of parts which will be set forth with particularity in the following description and claims appended hereto.

In the accompanying drawings, which illustrate one embodiment of the invention, and in which similar characters of reference indicate corresponding parts in all the views, Figure 1 is a sectional view of the windmill showing the rear wheel in elevation, the front wheel being removed; Fig. 2 is a side view of the windmill; Figs. 3 and 4 are detail sectional views on the lines 3—3 and 4—4 respectively of Fig. 2; Figs. 5 and 6 are diagrammatic views of gearing that maintains the wind wheels face to the wind; and Fig. 7 is a view showing the windwheel supporting journals.

Referring to the drawings, A and B designate the front and rear vane wheels which are spaced apart from each other to accommodate the wheel supporting means and the power transmitting mechanism that receives power from the wheels. The vanes 1 of the wheel A are pitched reversely to the vanes 2 of the wheel B, so that the wind in striking the wheel 1 will pass between the vanes thereof at an oblique angle to the plane of rotation and approximately at right-angles to the impinging faces of the vanes 2 of the wheel B, whereby the energy of the wind is more effectively abstracted.

The supporting means for the wheels comprises a tubular standard C which has, at the upper part of its base 3 a step bearing flange 4 on which rest bearing balls 5 that support a tubular element 6, such element having laterally-extending journals or axles 7 on which the wheels A and B are mounted.

The wheels A and B impart power to a common shaft 8 which is disposed in and extends through the tubular support C. This shaft 8 has on its upper end a bevel gear 9 which is adapted to mesh with bevel gears 10 and 11 fastened to the central part of the wheels A and B, respectively. Any suitable means may be employed for taking power from the shaft 8 for any desired purpose. In the present instance, as shown in Fig. 1, the shaft 8 has a gear wheel 12 which meshes with a gear wheel 13 on a power transmitting shaft 14 that is adapted to drive machinery of any character. The shaft 8 is capable of having longitudinal movement so as to throw the pinion 9 into or out of engagement with the gears 10 and 11, and for this purpose a screw 15 or equivalent means is mounted in a bracket 16 secured to a suitable part of the supporting frame or derrick 17 of the windmill, the said screw having a handwheel or equivalent turning means 18 at its lower end and a bearing element 19 at its upper end, on which element the lower end of the shaft 8 bears. The shaft 8 may slide freely through the gear 12 without shifting the relation thereof to the gear 13.

In order to maintain the wheels A and B in proper relation to the wind a guiding tail or vane A is provided, the same having a shank or stem 19 that is mounted on the tubular element or sleeve 6. The stem 19 is made in two parts *a* and *b* hingedly connected together at 20, so that the tail can be thrown to a position parallel with the wheels and with the wind when the windmill is to be stopped. This throwing of the guiding vane D into and out of operative position is accomplished by raising and lowering the rotating shaft 8 through the agency of means now to be described. On the upper end of the tubular element 6 is a bracket 21 which has hingedly connected thereto at 22 a lever 23 that is yoked or otherwise suitably secured at 24 with the upper end of the shaft 8. The outer end of the lever 23 is connected by a link 25 with the upper end of a vertically shiftable rod 26 movable in guides 27ª of the sleeve 6. The lower end of this rod 26 has a rack 27 that meshes with a pinion 28 fastened to a shaft 29, the said shaft 29 being rotatable in bearings 30 on the section *b* of the shank of the guiding vane D. This shaft 29 has a crank arm 31 which is connected by a link 32 with the section *a* of the shank 19 of the guiding vane, the point of connection 33 being to one side of the hinge 20, as clearly shown in Figs. 3 and 4. By this arrangement, when the shaft 8 is moved upwardly, it raises the rod 26, and this in turn rotates the pinion 28 so that the crank 31 on the shaft 29 throws the guide vane D laterally on the hinge 20 as a center until the guide vane is parallel with the wheels A and B.

The shifting of the wind acts on the guiding vane D in such a manner as to throw the wheels A and B into facing relation to the wind. For this purpose the section *b* of the shank of the guide vane D is pivotally connected at 34 with the tubular element 6, so that the guiding vane D can have a limited movement independently of the sleeve 6 for the purpose of throwing into or out of engagement a clutch gearing which causes one wheel or the other to shift the wheels in rotating into right-angular relation to the wind. As shown in Fig. 4, the sleeve 6 is provided with loops or limiting devices 35 through which the section *b* extends, such devices serving to limit the relative movement of the guiding vane D with respect to the sleeve 6. Wind acting on the guiding vane D cannot cause the same to swing about the hinge 20 as a center, as the operating connections formed by the parts 27, 28, 29, 31 and 32 constitute a lock for holding the sections *a* and *b* of the shank 19 rigidly together as one part. The lower end of the bar 26 has a slotted part 36 which passes through a slot 37 in the part *b*, Figs. 1 and 4. The walls of the slot are comparatively wide so as to provide engaging surfaces of substantial area for the purpose of causing a slight twisting or rotary movement of the rod 26 as the guide vane D shifts with respect to the sleeve 6, the bearings 27ª being large enough to provide for this slight turning movement of the rod 26. On the upper end of the rod 26 is secured a horizontal shaft 38 that is provided with a worm 39 arranged to engage fixed gear teeth 40 on the supporting standard C of the windmill, such teeth 40 being exposed through the sleeve 6 by the latter being made with an upper section *c* spaced from but connected with the lower section *c'* by connecting elements 41, Fig. 2. On the ends of the shaft 38 are pinions 42 and 43, Figs. 2 and 3, which are adapted to be thrown into and out of mesh with gears 44 and 45 fastened to the wheels A and B, respectively. Normally the pinions 42 and 43 are out of engagement with the gears 44 and 45, but when the wind shifts, the guiding vane D will turn or twist the rod 26 so as to throw either the pinion 42 into mesh with the gear wheel 44 or the pinion 43 into mesh with the gear 45, depending upon the direction in which the wind shifts. By this means the rotating wheel A or B will cause the worm shaft 38 to rotate, and in consequence the rotating worm 39 acts on the stationary gear teeth 40 to throw the wheels A and B and sleeve 6 in a direction to right the windmill; that is to say, to bring the wheels A and B into a position at right-angles to the wind.

Since the worm 39 is mounted on the vertically movable rod 26 the worm moves out of engagement with the stationary teeth 40 when the rod 26 moves upwardly in the act of throwing the guiding vane D to inoperative position. When this worm is disengaged from the teeth 40 the sleeve 6 is no longer locked to the stationary standard C, and consequently the wheels A and B and guiding vane D are free to turn as a unit on the standard with the changes in the direction of the wind, but when the windmill is in operation the worm 39 and teeth 40 constitute a lock to prevent free turning of the wheels A and B and guiding vane D on the standard, and the only way for these parts to turn on the standard is by the worm rotating by becoming geared or clutched to either one of the wheels A and B, as previously described. When the rod 26 is raised the pins 42 and 43 will be raised to the position represented by Fig. 5, and when the rod is lowered the pinions will occupy the non-meshing position with respect to gears 44 and 45 indicated in Fig. 6, but when the wind shifts the pinion 42 will mesh with gear 44, or pinion 43 will mesh with gear 45.

From the foregoing description taken in connection with the accompanying drawings, the advantages of the construction and method of operation and of the apparatus shown will be readily understood by those skilled in the art to which the invention appertains, and while I have described the principle of operation, together with the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. A windmill comprising oppositely rotating vane wheels, a supporting structure, a member mounted to turn thereon and supporting said wheels, a gearing connecting the wheels together and transmitting power therefrom, a guiding vane connected with the member and having a limited movement independently thereof, coacting means on the member and support for turning the member on the latter, and means for operatively connecting the means on the member to either of the said wheels to receive motion therefrom when the guiding vane moves relatively to the said member, whereby the wheels are maintained at right-angles to the wind.

2. A windmill comprising a support, a tubular member mounted to turn thereon, vane wheels mounted on the member, a gearing connecting the wheels together, a shaft receiving power from the gearing, a guide vane mounted on the member and having a limited movement independently thereof, gear teeth on the support, a worm arranged to engage the gear teeth, a connection between the worm and guiding vane whereby the former moves with the latter when the vane shifts with respect to the said member, and normally non-meshing bearing elements between the worm and each wheel, whereby the worm is turned to maintain the wheels faced to the wind.

3. A windmill comprising a supporting standard, a sleeve mounted thereon, gear teeth on the standard, a worm arranged to engage the teeth, a movable support for the worm, means for shifting the support to engage and disengage the worm and teeth, vane wheels mounted on the sleeve and rotating in opposite directions, a gearing between the wheels, gear wheels connected with the vane wheels, pinions connected with the worm and normally out of mesh with the said gear wheels, a guide vane connected with the sleeve to have a limited independent movement and operatively connected with the said movable support for the worm to actuate the support for engaging either pinion of the worm with its coacting gear wheel.

4. A windmill comprising a tubular supporting standard, a sleeve mounted thereon, oppositely-rotating vane wheels mounted on the sleeve, bevel gears connected with the wheels, a bevel gear arranged to mesh with the first-mentioned gears, a shaft connected with the last mentioned gear rotatably and axially movable in the standard, a guiding vane connected with the sleeve, and connecting means between the said shafts and guiding vane for throwing the latter into and out of operative position by the longitudinal movement of the shaft.

5. In a windmill, the combination of a vane wheel, a shaft driven thereby and axially movable, a supporting structure for the wheel, a guiding vane mounted on the said structure, a rack movable by the longitudinal movement of the said shaft, a pinion meshing with the rack, and a connection between the pinion and guiding vane for throwing the latter into and out of operative position.

6. In a windmill, the combination of a tubular supporting standard, a vane wheel, a shaft in the standard operatively connected with the wheel and movable axially, an element disposed outside the standard and connected with the shaft to be moved thereby, a rack on the element, a pinion meshing with the rack, a guiding vane movably mounted with respect to the standard, a shaft connected with the pinion and having a crank, and a connection between the crank and guide vane for throwing the latter into and out of operative position.

7. In a windmill, the combination of a tubular standard, a sleeve mounted thereon, a shaft rotatably and longitudinally movable in the standard, oppositely rotating vane wheels on the sleeve, bevel gears on the wheels, a bevel gear on the shaft to mesh with the first mentioned gear and disengageable from the latter by the longitudinal movement of the shaft, a rod mounted on the sleeve and connected with the shaft to move therewith, a guide vane mounted on the sleeve, and means between the rod and vane for throwing the latter into and out of operative position.

8. In a windmill, the combination of a tubular standard, a sleeve mounted thereon, a shaft rotatably and longitudinally movable in the standard, oppositely rotating vane wheels on the sleeve, bevel gears on the wheels, a bevel gear on the shaft to mesh with the first mentioned gear and disengageable from the latter by the longitudinal movement of the shaft, a rod mounted on the sleeve and connected with the shaft to move therewith, a guide vane mounted on the sleeve, means between the rod and vane for throwing the latter into and out of operative position, a worm carried by the rod, teeth on the standard with which the worm is engaged or disengaged by the movement of the rod, pinions connected with the worm, and gears connected with the vane wheels and normally out of mesh with the pinions, said vane having a limited movement independently of the sleeve and serving to actuate the rod for throwing either pinion into engagement with its coacting gear.

In testimony whereof I have signed my name to this specification in the presence of two subscribing witnesses.

CHARLES LEWIS LONSINGER.

Witnesses:
 JOHN PETER CLY,
 LEWIS GEORGE RIESE.

Copies of this patent may be obtained for five cents each, by addressing the "Commissioner of Patents, Washington, D. C."